Patented Aug. 5, 1924.

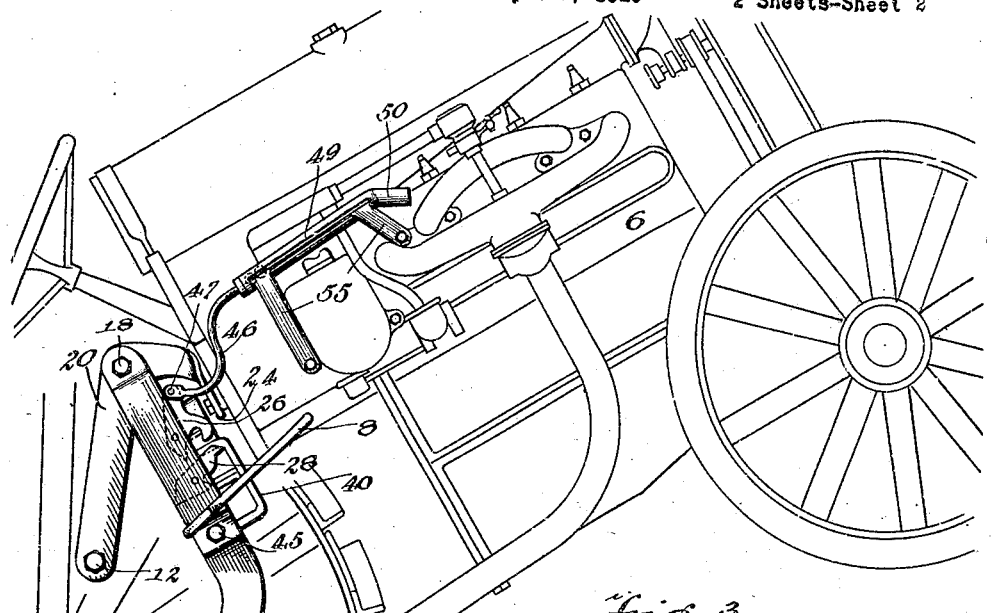

1,503,682

UNITED STATES PATENT OFFICE.

FRANK Y. BOYRIE, OF HILO, TERRITORY OF HAWAII.

AUTOMATIC CLUTCH-RELEASE DEVICE.

Application filed September 8, 1923. Serial No. 661,686.

*To all whom it may concern:*

Be it known that I, FRANK Y. BOYRIE, a citizen of the United States, and resident of Hilo, in Territory of Hawaii, have invented certain new and useful Improvements in Automatic Clutch-Release Devices, of which the following is a specification.

This invention relates to automatic clutch release devices for use on tractors.

As is well known tractors frequently "rear" as the result of the inability of the power wheels to turn and unless this movement is promptly checked by throwing out the clutch or otherwise the tractor will turn completely over and possibly injure the operator or cause serious damage to the tractor.

Therefore, an important object of this invention is to provide a clutch release apparatus which is entirely automatic in its operation and which functions as the result of the "rearing" of the tractor so that the accidental turning over of the tractor is prevented.

A further object is to provide an automatic clutch release which may be conveniently applied to a tractor without elaborately altering the same and without the exercise of unusual skill.

A further object is to provide an automatic clutch release which is of highly simplified construction, durable in use and cheap to manufacture.

Other objects and advantages will be apparent during the course of the following description.

In the accompanying drawings forming a part of this application and in which like numerals are employed to designate like parts throughout the same, Figure 1 is a side elevation of a tractor equipped with the improved clutch release apparatus, the tractor being in its normal horizontal position.

Figure 3 is a side elevation of the automatic clutch release device applied, the tractor being shown in an inclined position as the result of the inability of the wheels to turn.

Figure 4 is a group perspective of the improved automatic clutch release apparatus.

Figure 1:
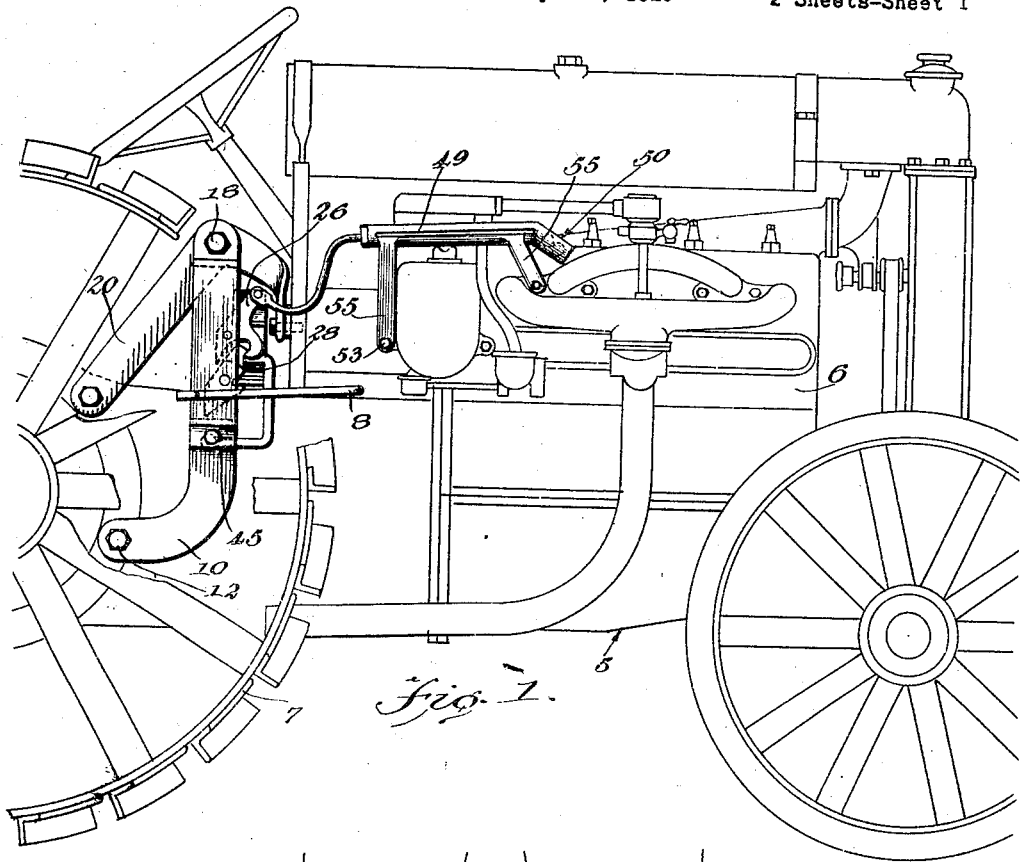
Figure 2:
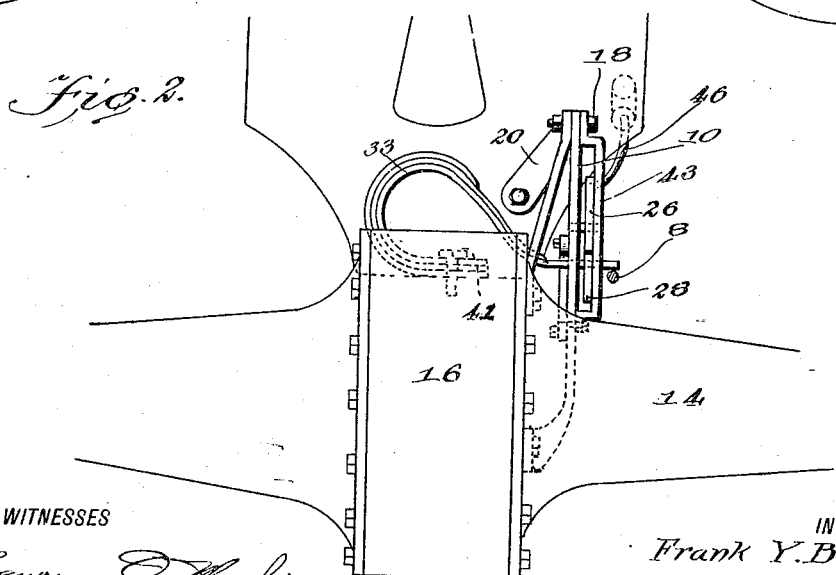
Figure 2 is a fragmentary rear elevation of the tractor, the view illustrating the automatic clutch release device.

In the drawing wherein for the purpose of illustration is shown a preferred embodiment of the invention, the numeral 5 generally designates a tractor having a prime mover or internal combustion engine 6 connected in the usual manner with the traction wheels 7. As is well known, the connection between the engine and the traction wheels may be broken by a clutch having a pedal 8 ordinarily depressed by the foot of the operator. It is the function of this invention to automatically depress the pedal 8 when the angle of the tractor reaches the danger point.

In carrying out the invention I provide a supporting bar or arm 10 having its lower portion curved and formed with an opening 11 for the reception of a bolt 12 by means of which the bar may be secured in position. The bolt 12 is one of a series of bolts by means of which the axle housings 14 are detachably connected to the differential housing 16 and in this connection it is noted that the employment of the standard bolts or original bolts on the tractor is utilized throughout so that the attachment may be applied without elaborately altering the construction of the tractor as originally manufactured and without the exercise of unusual skill.

The upper portion of the bar 10 is apertured for the reception of a bolt 18 by means of which the bar is secured to the intermediate portion of a substantially V-shaped bracing member 20. The V-shaped member consists of a pair of branches, one of which is secured in position by one of the bolts 12 and the other branch is secured flatly in engagement with the dash by means of a bolt 24.

The supporting bar 10 constitutes a supporting member for a trigger 26 and a latch 28. The latch 28 and the trigger 26 are pivotally connected to the supporting bar 10 and when in its operative position the trigger and more specifically the finger 30 of the same engages the upper terminal portion 32 of the latch and thereby holds the latch in a set position.

When the latch 28 is in the position illustrated in Figure 1, a main actuating spring 33 is partially received in a notch 34 in the latch and is thereby held in its retracted position. However, when the trigger 26 is actuated due to the inclination of the tractor the latch 28 is swung on its pivot so as to release the leaf spring 33 whereupon the spring engages and depresses the clutch pedal 8. When the clutch pedal 8 is thus depressed the connection between the engine and the rear wheels is broken and the tractor will return to its normal position with the front wheels thereof on the ground.

Figures 1 and 3 illustrate that the leaf spring 33 is guided by the bar 10 and by a U-shaped bracket 40 having side arms rigidly secured to the bar by bolts or other suitable means. It will be seen that the guide bracket 40 has a bight portion arranged in spaced parallel relation to the bar 10 and cooperates with the bar 10 in preventing lateral movement of the bowed spring. Also the attaching arms of the U-shaped member 40 limit the vertical spring action.

Attention is directed to the fact that the laminated spring 33 has one end turned upon itself and bolted to the combined engine case and frame through the medium of a bolt 41. The guide bracket 40 prevents the spring from turning and consequently only a single bolt 41 is necessary to hold the spring in position.

In carrying out the invention a protector bar 43 is extended over the trigger 26 and the latch 28 and has its end portions provided with attaching lugs 44 which are secured to the bar 10 by the bolt 18 and by the bolt 45. It will be seen that the protector bar 43 forms a reliable means for preventing objects from accidentally actuating the trigger 26 or the latch 28.

The trigger 26 may be operated by a trip rod 46 connected thereto as indicated at 47 and the trip rod is in turn actuated by a plurality of weighted spheres 48. It will be seen that the weighted balls 48 are slidable in a barrel 49 and when the tractor is in its normal position as illustrated in Figure 1 the balls are confined in a downwardly inclined branch 50 of the barrel. Figure 3 illustrates that the trip rod 46 is slidable through a bushing or bearing 51 which is detachably fitted in the barrel and the terminal portion of the trip rod extends beyond the bearing so that when the ball rolls rearwardly the trip rod will be actuated for releasing the main spring 33. The barrel 49 may be attached to the engine by means of fastening bolts 53 which are extended through attaching arms 55 extending downwardly from the barrel.

In operation the spheres 48 are positioned in the downwardly extending branch 50 and when the inclination of the tractor exceeds a predetermined angle the balls will roll rearwardly and strike the end of the trip rod 46 whereupon the trigger 26 and the latch 28 will be swung upon their pivots.

With the latch thus swung upon its pivot the spring 33 will be released and the clutch pedal 8 will be immediately depressed for breaking the driving connection between the engine and the rear wheels. This of course permits the tractor to return to its horizontal position.

It will be seen that the apparatus may be conveniently reset and will not be accidently operated as the result of vibrations.

It is to be understood that the form of the invention herewith shown and described is to be taken as a preferred example of the same and that such minor changes in arrangement and construction of parts may be made as will remain within the spirit of the invention and the scope of what is claimed.

Having thus described the invention, what I claim is:—

1. An automatic clutch release comprising a supporting member having means whereby the same may be secured to a tractor, a latch pivoted to the supporting member and having a notch, and a spring partially received in said notch and adapted to engage the clutch pedal of the tractor to depress the same.

2. An automatic clutch release comprising a supporting member having means whereby the same may be secured to a tractor, a latch pivoted to the supporting member and having a notch, a spring partially received in said notch and adapted to engage the clutch pedal of the tractor to depress the same, and a trigger pivoted to said supporting member and having a finger to engage said latch, whereby to hold the latch in position.

3. An automatic clutch release comprising a supporting member having means whereby the same may be secured to a tractor, a latch pivoted to the supporting member and having a notch, a spring partially received in said notch and adapted to engage the clutch pedal of the tractor to depress the same, a trigger pivoted to said supporting member and having a finger to engage said latch, whereby to hold the latch in position, a trip rod pivoted to said trigger for actuating the same, and a plurality of independent gravity actuated members to operate said trip rod.

4. An automatic clutch release comprising a supporting member having means whereby the same may be secured to a tractor, a latch pivoted to the supporting member and having a notch, a spring partially received in said notch and adapted to engage the clutch pedal of the tractor to depress the same, a trigger pivoted to said supporting member and having a finger to engage said latch, whereby to hold the latch in position, a trip rod pivoted to said trigger for actuating the same, a plurality of independent gravity actuated members to operate said trip rod, and a barrel slidably receiving said trip rod and slidably receiving said gravity actuated members, said barrel being provided with a downwardly directed branch to receive said gravity actuated members.

5. An automatic clutch release for tractors comprising a supporting member having means whereby the same may be secured to a tractor adjacent the clutch pedal thereof, a latch pivoted to the supporting member, a spring held in a set position by said latch, a trigger having a finger engaging said latch, said trigger being pivotally connected to the supporting member, a protecting member extending over said latch and said trigger and secured to said supporting member, a U-shaped guide bracket secured to said supporting member and cooperating with the same in holding the spring against lateral movement, a trip rod pivoted to said trigger, a barrel having a guide bearing slidably receiving the trip rod, a plurality of gravity actuated spheres slidable in said barrel and adapted for moving said trip rod longitudinally whereby to actuate said trigger and said latch, said barrel being provided with an inclined branch normally receiving said spheres, and a bracing member for said supporting member.

FRANK Y. BOYRIE.